A. L. BLOMQUIST.
TOWING DEVICE.
APPLICATION FILED AUG. 11, 1919.
1,349,556.
Patented Aug. 17, 1920.
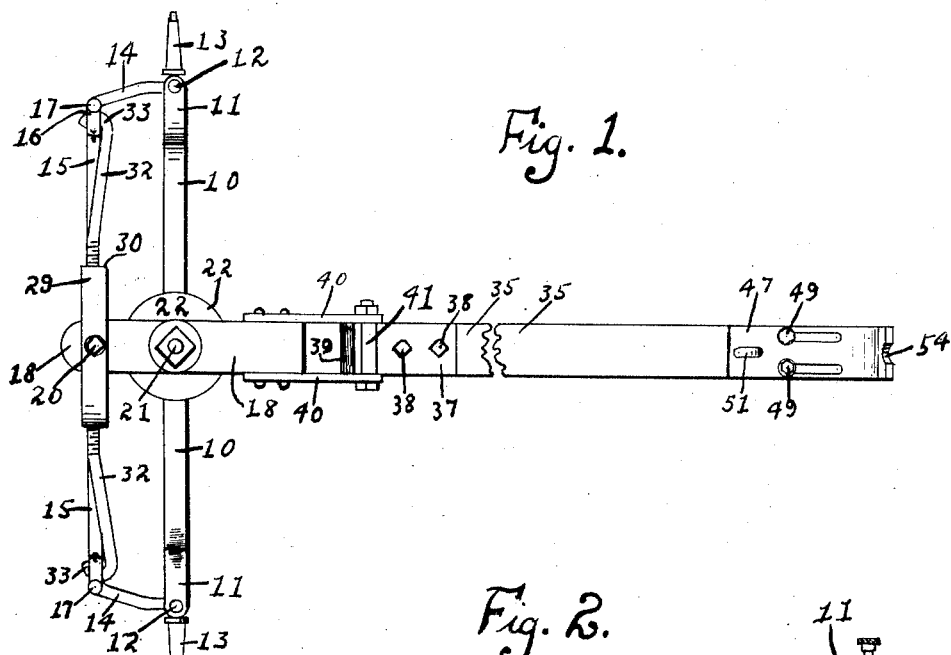
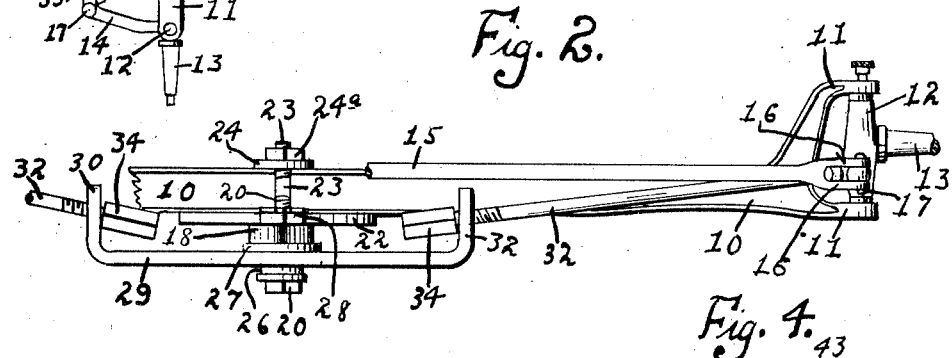
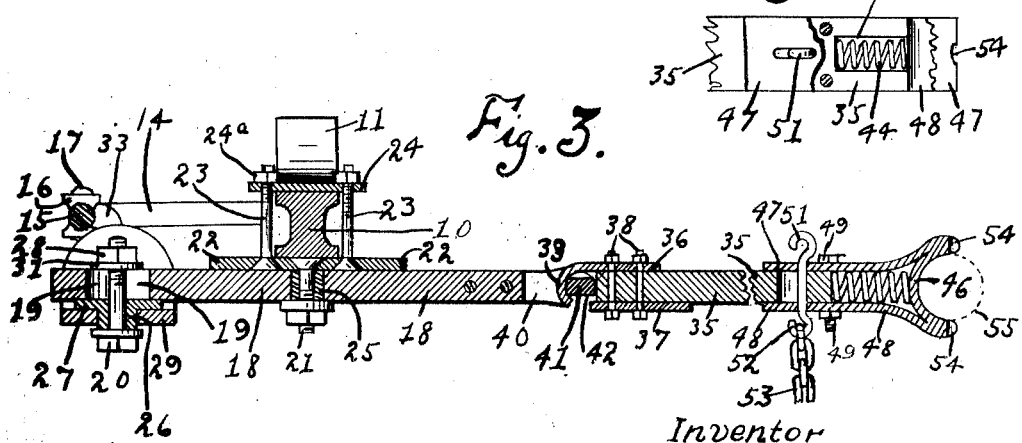
Inventor
Alfred L. Blomquist
By Orwig & Bair attys.

UNITED STATES PATENT OFFICE.

ALFRED LEONARD BLOMQUIST, OF GOWRIE, IOWA.

TOWING DEVICE.

1,349,556.  Specification of Letters Patent.  Patented Aug. 17, 1920.

Application filed August 11, 1919. Serial No. 316,897.

*To all whom it may concern:*

Be it known that I, ALFRED LEONARD BLOMQUIST, a citizen of the United States, and resident of Gowrie, in the county of Webster and State of Iowa, have invented a certain new and useful Towing Device, of which the following is a specification.

The object of my invention is to provide a towing device of simple, durable and inexpensive construction.

A further object of my invention is to provide an attachment, whereby the automobile or other similarly steered vehicle may be towed by a second vehicle without requiring that someone remain in the towed vehicle to steer it and to retard its progress to prevent collision between the two vehicles.

A further object of my invention is to provide such a towing device, which is readily attachable or detachable, relative to the standard parts of automobiles, whereby it may be attached to any of the numerous makes of machines.

A further object of my invention is to provide automatically adjusting means, whereby the towing device will set itself to steer different automobiles.

A further object of my invention is to permit movement of the towed vehicle relative to the towing vehicle and to interpose a yielding buffer between the latter and the former.

With these and other objects in view, my invention consists in the construction, arrangement and combination of the various parts of the device, whereby the objects contemplated are attained, as hereinafter more fully set forth, pointed out in my claim and illustrated in the accompanying drawings, in which:

Figure 1 is a bottom view of my improved device, parts of an automobile being shown to illustrate the manner of its installation.

Fig. 2 is an end elevation of a portion of the device.

Fig. 3 is a longitudinal, vertical, central, sectional view through the device, and Fig. 4 shows a top or plan view of one end of the device, parts being broken away to better illustrate the construction.

Referring to the accompanying drawings, I have used the reference numeral 10 to indicate generally the front axle of an automobile, having clevises 11 at either end, designed to receive spindles 12 to which are secured stub axles 13, designed to carry the front wheels of the automobile.

Extending rearwardly from the spindles 12 are steering arms 14. Extended between the rear ends of the arms 14 is a steering rod 15, having at either end a clevis 16 designed to receive a pin 17 upon which the rear end of the arms 14 are pivoted.

It will be noticed that the clevis 16 has fingers of considerable length, so that there is an appreciable space between the arms 14 and the near ends of the fingers. The parts just described are of ordinary and well-known construction and form no part of my invention, excepting so far as my improvement is attached thereto.

My invention comprises a tongue device, which may be pivotally mounted on the axle 10 and secured to the steering rod 15, whereby movement of the tongue relative to the axle may cause corresponding movement of the steering rod to thereby swing the stub axles 13 for steering the vehicle to which they are attached. To accomplish this result, I provide a sectional tongue, to the rear section of which I have given the reference numeral 18, which has an elongated slot 19 therein, designed to receive a bolt 20 and an opening to receive a bolt 21. One end of the bolt 21 is passed through and secured to a plate 22, which also has openings therethrough, designed to receive spaced parallel upwardly extending bolts 23.

A second plate 24 has openings therein designed to receive the bolts 23 and to coact with nuts 24ª. Surrounding the bolt 21 is a sleeve 25 of a length equal to or greater than the thickness of the tongue section 18. The opening in the tongue section 18 is of sufficient size to permit rotation of the sleeve 25 therein.

From the construction of the parts just described, it will be seen that the spaced plates 22 and 24 together with the bolts 23 and nuts 24ª form a gripping member between which the axle 10 may be gripped to prevent movement of the plate 22 relative to the axle.

By means of the sleeve 25 and bolt 21, the plate 22 is pivotally connected to the tongue section 18 to permit free swinging movement of the tongue relative to the axle 10. Mounted on the bolt 20 adjacent to the lower surface of the tongue section 18 is a sleeve 26, having an annular, outwardly extending flange 27 at its upper end, designed to bear against the lower surface of the tongue section 18, when the nut 28 on the bolt 20 is tightened.

Rotatably mounted on the sleeve 26 is a yoke 29, which may be composed of resilient material, and which has at either end upwardly extending ears 30, having openings therein for a purpose which will hereinafter be set forth.

From the construction of the parts just described, it will be seen that the bolt 20 may be moved longitudinally in the slot 19 by loosening the nut 28, which will permit the flange 27 and washer 31 to slide along the surface of the tongue section. When, however, the nut 28 is tightened, the bolt 20 will be held from movement relative to the tongue section 18 by the frictional engagement of the washer 31 and flange 27 with the surfaces of the tongue section.

In any position of the bolt 20, however, the yoke 29 will be permitted free, pivotal movement relative to the tongue section.

Extended through the openings in the ears 30, which have hereinbefore been mentioned, are rods 32 having at their outer ends hook members 33, designed to extend through between the fingers of the clevis 16 at either end of the steering rod 15.

The ends of the rods 32 adjacent to the ears 30 are screw-threaded to coact with nuts 34, which are disposed between the ears 30.

From the construction of the parts just described, it will be seen that the yoke 29 may be held from movement relative to the steering rod 15, by passing the hook members 33 through the clevises at the ends of the steering rod, and then tightening up the nuts 34. It will also be seen that rotation of the tongue section 18 on the bolt 21 will cause the yoke 29 to reciprocate from side to side thereby moving with it the steering rods 15, and causing a corresponding movement of the steering arms and stub axles 13.

It will therefore be seen that if a vehicle is secured to the forward end of the tongue section 18, then a turning of the forward or towing vehicle will cause a swinging of the tongue 18 with a corresponding swinging of the stub axles 13, thereby causing the vehicle to which the axle 10 is secured to follow and substantially "track with" the towing vehicle.

I have provided the following means for connecting the tongue section 18 with the vehicle which is doing the towing. A second tongue section 35 has plates 36 and 37 secured to the rear end of its upper and lower surfaces respectively, by means of bolts 38. The upper plate 36 is provided with a rearwardly extending hook member 39, which is bent over to be positioned spaced somewhat from the rear end of the plate 37 for a purpose which will hereinafter be set forth.

At either side of the forward end of the tongue section 18 are plates 40, which extend somewhat past the front end of the tongue section and receive a pintle member 41. The pintle member 41 has flattened sides 42, making the vertical diameter of the pintle member substantially equal to the distance between the end of the hook 39 and the plate 37. The horizontal diameter of the pintle 41 is greater than its vertical diameter, whereby its front and rear surfaces form a bearing for the hook member 39 and the tongue section 35.

From the construction of the parts just described, it will be seen that pivotal movement on a horizontal axis may be permitted between the tongue section 18 and the tongue section 35. By swinging the tongue section 35 to a substantially vertical position, it may be readily detached by sliding the hook member off the pintle over the flattened portions 42. At the forward end of the tongue section 35 is a longitudinal recess 43 designed to receive a spring 44.

A device for securing said end of the tongue section to the axle or any other suitable part of the towing vehicle comprises a strip of material, having a central portion 46 substantially semicircular in vertical section and having its ends 47 and 48 extended rearwardly from the semicircular portion to engage the upper and lower surfaces of the tongue section 35. The portions 47 and 48 are provided with elongated slots, designed to receive bolts 49, which are extended through the tongue 35 to thereby permit reciprocation of the device longitudinally relative to the tongue.

The spring 44 engages the rear central portion of the semicircular portion 46, thereby normally yieldingly holding the device at the forward limit of its movement, as defined by the slots and bolts 49.

The tongue section 35 is also slotted to receive a shank 50, which is secured to the portions 47 and 48 and provided at its upper end with a hook 51 and at its lower end with an eye 52. Fixed in the eye 52 is a chain member 53. The semicircular portion 46 has notches 54 at the central portion of its upper and lower edges for a purpose which will hereinafter be set forth.

From the construction of the parts just described, it will be seen that the semicircular portion 46 may be placed against the rear axle housing of a towing vehicle indicated by the dotted lines 55 in Fig. 3, and then the chain 53 may be brought up through the slots or recesses 54 around the housing 55 and hooked upon the hook 51.

If pressure be exerted against the portion 46 at the time the chain is being hooked, it will be seen that the spring 44 may be compressed somewhat, so that it will hold the chain 53 taut at all times.

In the practical operation of my improved device, it will be assumed that it is desired to tow an automobile for any reason whatever, such for instance, as a failure of the machine to work or the absence of a competent driver. My towing device may be readily and easily connected thereto by loosening the nuts 24ª and removing the plate 24, whereby the bolts 23 may be moved up along either side of the axle 10 and then the nuts and plate may be replaced to clamp the axle between the plate 24 and plate 22.

These parts should be so arranged that the bolt 21 will be disposed substantially midway between the ends of the axle 10. In this connection, it may also be mentioned, that it may be desirable to form the plate 24 of somewhat resilient material or with a roughened lower surface, in order to better grip the upper edge of the axle 10.

Next the nut 28 should be loosened to permit movement of the bolt 20 within the slot 19 and the nuts 34 loosened so that the hook members 33 may be hooked in the clevises 16.

The nuts 34 should then be tightened to lock the yoke 29 from movement relative to the steering rod 15, which will cause the bolt 20 to assume a position spaced a proper distance from the bolt 21. The nut 28 may then be tightened to prevent movement of the bolt 20 within the slot 19.

If the chain 53 be now passed around a suitable part of the vehicle which is doing the towing and through the recesses 54 it may then be hooked upon the hook 51 and the device will be ready for use.

In some cases, however, it may be desirable to back the towing vehicle against the portion 46, so that the spring 44 will be compressed slightly to cause the chain 53 to remain taut at all times, and the semicircular portion to engage the portion of the towed vehicle tightly.

It will be understood that the distance between the bolt 21 and the bolt 20 should always be substantially equal to the distance between the pin 17 and the spindle 12, so that swinging movement of the tongue section will not cause binding of the yoke 29 or the parts associated therewith.

It may therefore be necessary with certain cars to first tighten the nut 28 to hold the bolt 20 in the proper position within the slot 19 before the nuts 34 are tightened against the ears 30.

Some changes may be made in the construction and arrangement of the parts of my improved device, without departing from the essential features and purposes of my invention, and it is my intention to cover by my claim any modified forms of structure or use of mechanical equivalents which may be reasonably included within its scope.

I claim as my invention:

In a device of the class described, a tongue having a slot formed adjacent to one end thereof, and an opening intermediate of its ends, a pin extended through and pivotally mounted within said opening, a clamping device mounted on said pin adapted to receive the front axle of a vehicle, a bolt extended through the slot and adapted to slide from one end thereof to the other, a sleeve mounted on said bolt, having an annular, outwardly extending flange at one end adapted to engage the surface of said tongue adjacent to said slot, whereby tightening of the bolt may draw the flange against the tongue to hold the bolt from movement within the slot, and a clamping device rotatably mounted on said sleeve and adapted to engage the steering rod, whereby the distance between the bolt and pin may be selectively adjusted to correspond to the length of a steering arm on a vehicle axle.

Des Moines, Iowa, July 16, 1919.

ALFRED LEONARD BLOMQUIST.